United States Patent
Ekholm

(10) Patent No.: US 10,214,871 B2
(45) Date of Patent: Feb. 26, 2019

(54) SCREEN INTAKE FLOW CONTROL AND SUPPORT DEVICE

(75) Inventor: Michael Ekholm, Minneapolis, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 616 days.

(21) Appl. No.: 13/117,405

(22) Filed: May 27, 2011

(65) Prior Publication Data

US 2012/0298572 A1 Nov. 29, 2012

(51) Int. Cl.
*B01D 35/28* (2006.01)
*E02B 9/04* (2006.01)
(Continued)

(52) U.S. Cl.
CPC ............... *E02B 9/04* (2013.01); *B01D 29/33* (2013.01); *B01D 29/48* (2013.01); *B01D 29/54* (2013.01); *B01D 29/902* (2013.01); *B01D 35/1576* (2013.01); *E03B 3/04* (2013.01); *B01D 2201/44* (2013.01); *Y02E 10/22* (2013.01)

(58) Field of Classification Search
CPC ............ B01D 35/02; B01D 2201/0415; B01D 29/445; B01D 2201/44; B01D 29/33; B01D 29/48; B01D 29/54; B01D 29/902; B01D 35/1576; B01D 21/0012; B01D 21/0039; B01D 21/0033; B01D 21/0042; B01D 21/0063; B01D 21/2422; B01D 21/2427;
(Continued)

(56) References Cited

U.S. PATENT DOCUMENTS 2,754,003 A * 7/1956 Fenner ........................ 210/134
3,887,718 A * 6/1975 Hinds, Jr. .................... 426/491
(Continued)

FOREIGN PATENT DOCUMENTS

| DE | 29606945 | * | 8/1996 | .............. E03B 3/02 |
| EP | 1818089 A1 | | 8/2000 | |
| WO | WO03014481 A1 | * | 2/2003 | ............. B01D 29/11 |

OTHER PUBLICATIONS

"Innovative Solutions in Screen Technology," by Johnson Screens, a Weatherford Company; obtained from www.johnsonscreens.com, (c) 2006, JS-BR5313-0505 WFT4371.00, 12 pages.
(Continued)

*Primary Examiner* — Bobby Ramdhanie
*Assistant Examiner* — Denise R Anderson
(74) *Attorney, Agent, or Firm* — Patterson Thuente Pedersen, P.A.

(57) ABSTRACT

A screen intake has a central body with two screens attached on either end. Each of the screens has an interior that communicates with a hollow of the body via flow modifiers. These flow modifiers include one or more pipes disposed in the interior of the screens and through passages in ends of the body. A flow control support device disposed within the body supports the body's sidewall and divides the hollow into at least two portions—each communicating with flow from one of the flow modifiers. The device can include one or more plates disposed adjacent one another within the internal hollow with a peripheral edge attached to an inside of the body's sidewall. At least one of the one or more plates can be solid, or one or more of the plates can define openings therein allowing passage of at least some fluid therethrough.

20 Claims, 2 Drawing Sheets

(51) Int. Cl.
   *B01D 35/157*   (2006.01)
   *B01D 29/33*    (2006.01)
   *B01D 29/48*    (2006.01)
   *B01D 29/54*    (2006.01)
   *B01D 29/90*    (2006.01)
   *E03B 3/04*     (2006.01)

(58) Field of Classification Search
   CPC ... B01D 21/245; B01D 21/0045; Y02E 10/22;
               F04B 53/1037; E02B 9/04; E03B 3/04
   USPC ......................................................... 210/340
   See application file for complete search history.

(56) References Cited

U.S. PATENT DOCUMENTS

| | | | |
|---|---|---|---|
| 3,898,164 A * | 8/1975 | Hsiung | B01D 21/0063 210/521 |
| 4,162,219 A * | 7/1979 | Miropolsky et al. | 210/108 |
| 4,400,280 A * | 8/1983 | Larsson | B01D 17/0208 210/519 |
| 4,729,828 A * | 3/1988 | Miller | C02F 3/082 210/150 |
| 5,670,039 A * | 9/1997 | Harris | 210/138 |
| 6,051,131 A | 4/2000 | Maxson | |
| 2004/0065614 A1* | 4/2004 | Gordon et al. | 210/650 |

OTHER PUBLICATIONS

Australian Patent Office, Australian Application No. 2012202612 Examination Report dated Aug. 26, 2013, pp. 1-3.
Canadian Patent Office, Canadian Application No. 2,776,660 Office Action dated Apr. 30, 2013, pp. 1-2.
European Patent Office, European Patent Application No. 12169647.0 Extended European Search Report dated Feb. 4, 2013, pp. 1-5.

\* cited by examiner

SCREEN INTAKE FLOW CONTROL AND SUPPORT DEVICE

BACKGROUND

Manufacturing plants, irrigation systems, and power generation facilities use large quantities of water for their operation. To collect the water, screen intakes are used in various bodies of water. One common type of screen intake has a tee configuration with two screens on opposing ends. The screen intakes must be designed to protect aquatic life and to prevent buildup of debris along the length of the intake's screens. To do this, the flow velocity through the screens should be kept below a maximum peak level, which may be about 0.5 f/s. One way to reduce the flow resistance and control the flow velocity at the screen's surface is to use flow modifiers inside the screen intake. For example, Johnson Screens—the assignee of the present disclosure—improves flow uniformity using flow modifiers as disclosed in U.S. Pat. No. 6,051,131, which is incorporated herein by reference in its entirety.

When used, the screen intakes may also be installed in applications subjecting the intake to external pressures and impact loads. Likewise, fluid passing through the screen intake may experience pressure drops and additional flow resistances that reduce the flow capacity of the screen intake. What is needed is a screen intake that not only has the advantages of uniform flow velocity at the screen's surface, but that further reduces flow resistances within the intake and strengthens the structural support of the intake to resist external pressures and impact loads.

DETAILED DESCRIPTION

Figure 1A:
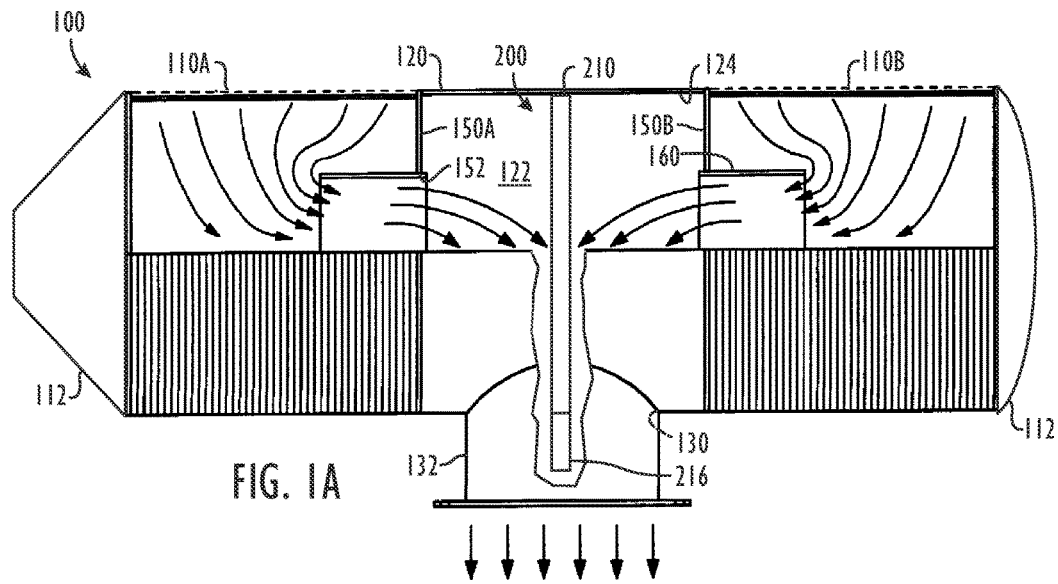
FIG. 1A illustrates a partial cross-section of a screen intake having a tee configuration, single tubular flow modifiers, and a flow control support device.
Figure 1B:
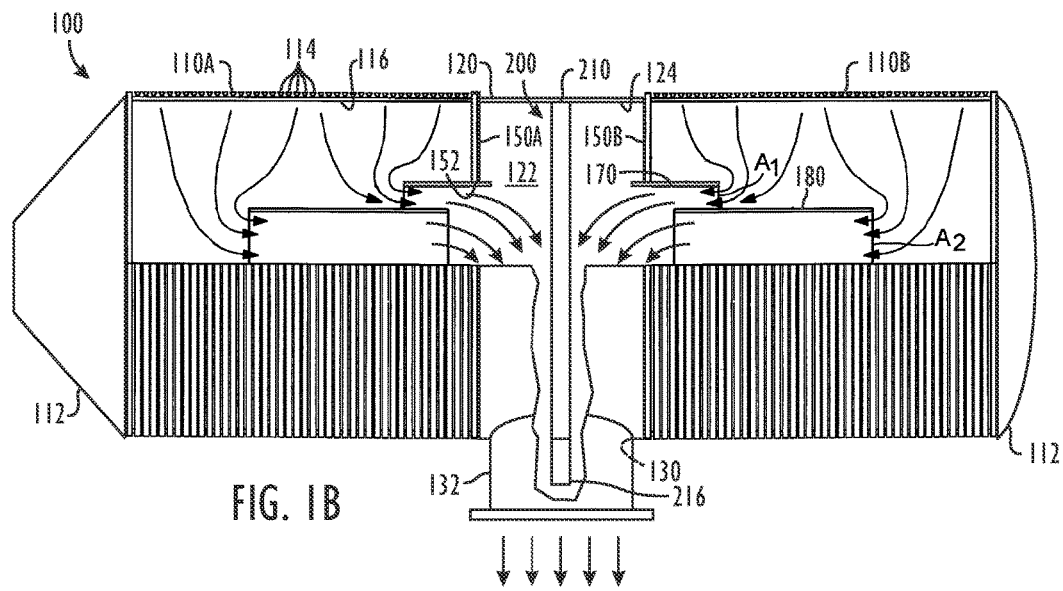
FIG. 1B illustrates a partial cross-section of a screen intake having a tee configuration, dual tubular flow modifiers, and a flow control support device.

A screen intake 100 illustrated in FIGS. 1A-1B has a tee configuration and has first and second screens 110A-B connected on opposing ends of a central body 120. The central body 120 defines a hollow 122 therein and has a cylindrical sidewall 124 and opposing end walls 150A-B. An outlet 130 in the sidewall 124 connects by a conduit 132 to other components of a fluid intake system (not shown). Both end walls 150A-B have a central opening 152 receiving flow from one of the screens 110A-B.

Both screens 110A-B have open ends connected to the body's end walls 150A-B and have closed ends caps 112 that may be shaped to deflect debris. Each of the screens 110A-B is cylindrical in shape and defines a plurality of slots for entry of water into the screen 110A-B. The slots can be either transverse or parallel to the axis of the screen 110A-B. Preferably, spaced wraps of profiled wire 114 form the slots on the cylindrical surfaces of the screens 110A-B, although the screens 110A-B can also be a solid pipe member with slots formed therein. The profiled wire 114 is preferably wedged or Vee-shaped with a wider base of the wire 114 facing outward to enhance the sliding of debris over the screens' surfaces. For example, the profiled wire 114 can be VEE-WIRE® available from Johnson Screens. (VEE-WIRE is a registered trademark of Weatherford/Lamb, Inc.). In one implementation and as shown in FIG. 1B, a plurality of these profiled wires 114 are circumferentially wrapped and welded to inner support bars 116 to form the screens 110A-B using techniques known in the art.

The central passages 152 in the end walls 150A-B may be sufficient to control the flow velocity at the screen's surfaces so as to maintain a preferred surface flow velocity. However, each end wall 150A-B preferably has a flow modifier disposed in its central opening 152 to further control the flow velocity. In general, the screen intake 100 can use flow modifiers having one or more pipes disposed in the openings 152 and partially inside the screens 110A-B to communicate fluid from inside the screens 110A-B, through the openings 152 in the end walls 150A-B, and into the hollow 122 of the central body 120. For example, the intake 100 embodied in FIG. 1A uses single flow pipes 160 for the flow modifier disposed in the openings 152, while the intake 100 embodied in FIG. 1B uses double flow pipes 170 and 180 nested inside one another in the openings 152.

The screen intake 100 and flow modifiers are designed to reduce the entrance velocity at the screens' slots to about 0.135 m/s or 0.5 f/s. Such a lower entrance velocity protects surrounding aquatic life and prevents debris clogging. Designers configure the lengths, diameters, flow areas, and other variables of the flow modifiers' pipes 160 and 170/180 to keep the average flow through the screens' surfaces as close to the allowable peak flow velocity and as uniformly distributed across the screens' surfaces as possible. Where the flow modifier uses two pipes 170/180 as in FIG. 1B, for example, the larger diameter pipe 170 may be about 50% of the screen 110's diameter and may be about 16% of the length of the screen 110. The smaller diameter pipe 180 nested within the outer pipe 170 may have a diameter about 70% that of the outer pipe 170 and may have a length which extends about 67% of the length of the screen 110. Further details of the design of the flow modifiers are disclosed in U.S. Pat. No. 6,051,131, which is incorporated herein in its entirety.

Although effective with the flow modifiers alone, the screen intake 100 of FIGS. 1A-1B also includes a flow control support device 200 disposed within the central body 120 and dividing the hollow 124 into at least two separate portions. As shown in FIGS. 1A-1B, the flow control support device 200 includes a solid plate 210 that divides the hollow 122 into two separate portions. A first of the hollow's portions communicates with flow from the first screen 110A via the flow modifiers (pipe 160 or pipes 170/180), and a second of the hollow's portions communicates with the fluid from the second screen 110B via the flow modifiers (pipe 160 or pipes 170/180). In this way, the plate 210 can control the fluid flow merging inside the hollow body 120 from the first and second screens 110A-B and can reduce turbulence in the merged fluid flow as it is directed to the outlet.

Figure 2A:
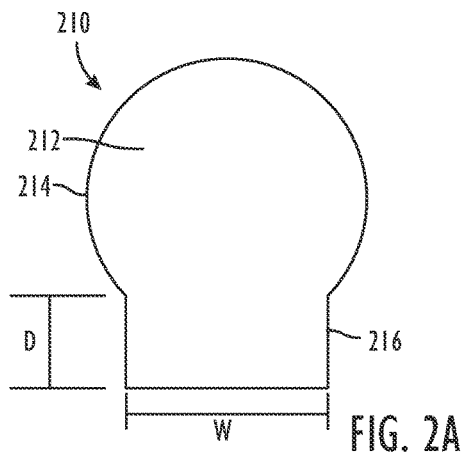
FIG. 2A illustrates a frontal view of a solid plate for a flow control support device.

The plate 210 shown in frontal view in FIG. 2A has a solid face 212 and a peripheral edge 214. When disposed in the hollow body (120), this peripheral edge 214 attaches to the inside of the hollow body's sidewall (124) by welding, bracketing, or the like either continuously or partially around the edge 214. In this way, the plate 210 attached to the sidewall (124) internally supports the hollow body (120) against internal and external pressures and impact loads.

The plate 210 can also have a tab 216 that extends from the peripheral edge 214. As shown in FIGS. 1A-1B, this tab 216 disposes through the outlet 130 of the hollow body 120 and partially into the conduit 132 connected to the outlet 130. As shown in FIG. 2A, the width W of this tab 216 can be the same as the size of the outlet (130), and the table 216 can extend a distance D within the outlet's conduit (132). The distance D can be configured for a particular implementation and may depend on the fluid flow rates, the type of fluid, the size of the outlet, the number of plates used, the size of the screen intake, and other factors evident to one skilled in the art with the benefit of the present disclosure.

Figure 2B:
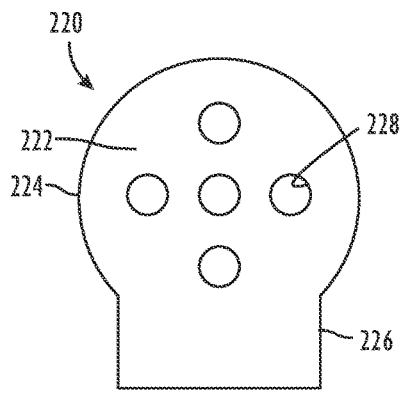
FIG. 2B illustrates a frontal view of a perforated plate for a flow control support device.

Although the flow control support device 200 in FIGS. 1A-1B uses the solid plate 210 as shown, a partial plate or a perforated plate having one or more holes, slots, openings, or the like can also be used. For example, a perforated plate 220 illustrated in FIG. 2B has a central body 222, a peripheral edge 224, and a tab 226—each of which can be essentially the same as the solid plate 210 of FIG. 2A. In the central body 222, however, the perforated plate 220 has one or more openings 228 allowing at least some passage of fluid through the plate 220. These openings 228 can be circular holes, rectilinear slots, elongated slits, or other appropriate shape. Moreover, these openings 228 can be arranged symmetrically or randomly in the central body 222. In general, the number, size, and shape of these openings 228 may be based in part on the particular implementation in which the plate 220 is used, including considerations of the type of fluid, desired flow rates, number of plates (perforated or not) used, size of the screen intake, etc.

Figure 3A:
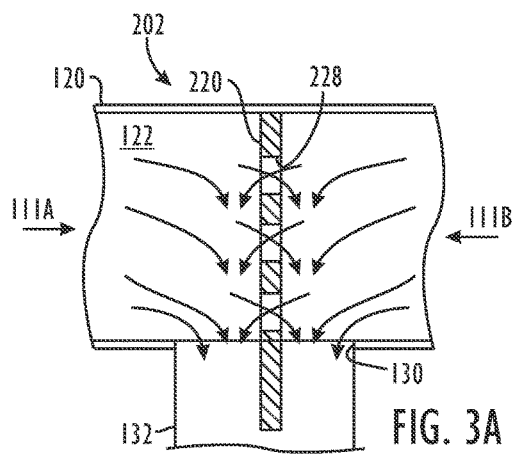
FIG. 3A illustrates a flow control support device having a single perforated plate installed in the screen intake's hollow body.

As shown in FIG. 3A, a flow control support device 202 installed in the hollow body 120 can include one such perforated plate 220 alone. Fluid flows 111A-B from the opposing screens (not shown) meet at the perforated plate 220 to be directed to the outlet 130. The plate's openings 228, however, permit at least some of the flow 111A-B to intermix with opposing flow on the other side of the plate 220 as the flow impinges toward the plate 220 and passes through the openings 228.

Figure 3B:
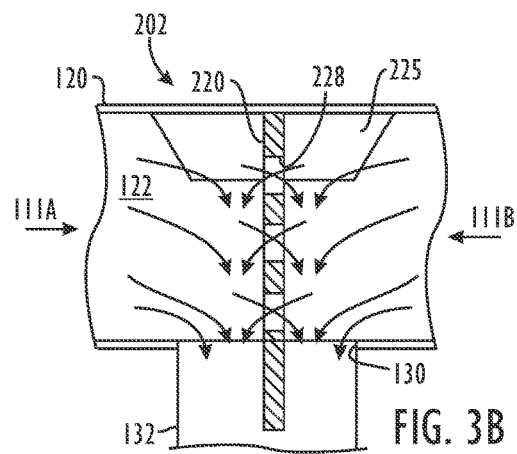
FIG. 3B illustrates a flow control support device having a single perforated plate and longitudinal modifier installed in the screen intake's hollow body.

As shown in FIG. 3B, the flow control support device 202 installed in the hollow body 120 can also include one or more longitudinal modifiers 225 arranged relative to the plate 220. These one or more longitudinal modifier 225 can be dispose around the inside of the hollow body 120 in any desirable manner, and they can extend into the body 120 to any desirable extent, depending on the implementation.

Figure 4:
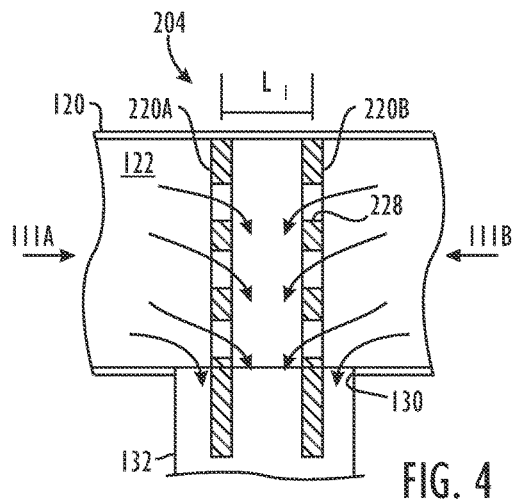
FIG. 4 illustrates a flow control support device having multiple perforated plates installed in the screen intake's hollow body.

As shown in FIG. 4, another flow control support device 204 installed in the hollow body 120 can include two such perforated plates 220A-B. Although two plates 220A-B are shown, more than two perforated plates 220 could also be installed in the hollow body 120 in other implementations. These two perforated plates 220A-B are positioned adjacent one another in the hollow body 120, essentially dividing the body's hollow 122 into two portions with a central area between the plates 220A-B. Fluid flows 111A-B from the opposing screens (not shown) meet each of the perforated plates 220 to be directed to the outlet 130. Here, the plate's openings 228 permit at least some of the opposing flow 111A-B to intermix in the central space between the plates 220A-B to be directed to the outlet 130.

As shown in FIG. 4, the openings 228 in the adjacent plates 220A-B can be aligned with one another. Depending on the implementation, however, the openings 228 may be offset from one another so they do not align. As also shown, these two perforated plates 220A-B are separated by a distance $L_1$, which like the number, size, and other features of the openings 228, may be configured for a particular implementation depending on the various considerations detailed herein. Moreover, although both plates 220A-B are perforated, one of the plates could be a solid plate or a partial plate, for example, depending on the direction of flow outside the intake.

Figure 5:
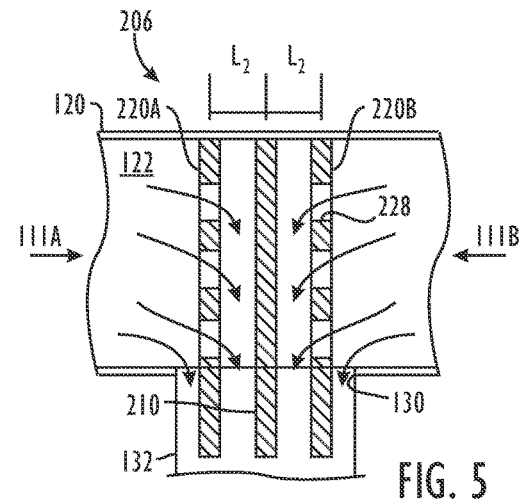
FIG. 5 illustrates a flow control support device having a solid plate and multiple perforated plates installed in the screen intake's hollow body.

In yet another alternative shown in FIG. 5, a flow control support device 206 installed in the hollow body 120 can include a solid plate 210 and two or more perforated plates 220A-B disposed adjacent one another in the hollow body 120. As shown, the central plate of the arrangement is the solid plate 210, and the two outside plates on either side of the central plate 210 are perforated plates 220A-B having openings 228 therein. Although two perforated plates 220A-B are shown on either side of the central plate 210, more than two perforated plates 220 could be positioned on each side of the central plate 210. The openings 228 in the perforated plates 220A-B allow for some flow 111A-B to pass through these plates 220A-B to be controlled by the next plate in the flow path. The central plate 210, although shown as being solid, could itself include one or more openings as well.

Again, these plates 210 and 220A-B are positioned adjacent one another in the hollow body 120, essentially dividing the body's hollow 122 into two portions. Thus, fluid flows 111A-B from the opposing screens (not shown) meet each of the perforated plates 220A-B to be directed to the outlet 130. The plate's openings 228 permit at least some of the flow 111A-B to pass in between the plates 220A-B and the central plate 210 to be directed to the outlet 130. As shown, these plates 210 and 220A-B are separated by a distance $L_2$, which like other features of the plates 210/220A-B, may be configured for a particular implementation depending on the various considerations detailed herein.

As noted previously, the flow modifiers of pipes 160 and 170/180 are typically used in the screens 110A-B to control velocity at the screen's surface. The flow control support devices 200-206 disclosed herein address the flow after the fluid passes through the flow modifiers. Therefore, the devices 200-206 act on the area of greatest pressure drop or flow resistance inside the screen intake 100 by controlling the merging flow 111A-B from the two screens 110A-B and reducing turbulence or swirling flow that may develop inside the screen intake 100. In addition, the devices 200-206 help to support the structural resistance of the intake 200 by reinforcing the central body's sidewall 124. Furthermore, the support from the plates 210/220 may allow the sidewall 124 to have a smaller thickness may eliminate the need for additional reinforcement to reduce the potential of collapse.

The foregoing description of preferred and other embodiments is not intended to limit or restrict the scope or applicability of the inventive concepts conceived of by the Applicants. Features on one embodiment can be combined with features of another embodiment, as will be appreciated with the benefit of the present disclosure. Moreover, the embodiments have been shown as being symmetrical, but this is not strictly necessary. For example, the plate(s) (e.g., 210 and/or 220) do not need to be in the center of the hollow body 120. Instead, the position of the plate(s) can be different, especially if the screen intake 100 is asymmetric (i.e., one cylindrical end is longer than the other).

Although the disclosed flow control and support device has been disclosed for use in screen intakes having flow modifiers of one or more pipes, the device could be used in a screen intake that lacks pipes and simply uses flow passages in the end walls of the central body that allows flow from the interior of the screens to enter the hollow of the central body. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A screen intake, comprising:
  a central body configured for placement in a body of water, the central body having a longitudinal axis, defining an internal hollow and including a sidewall and first and second opposing ends, the first opposing end with a first end wall contiguous with the sidewall, the second opposing end with a second end wall contiguous with the sidewall, the sidewall defining an outlet therethrough at a position extending a distance along the longitudinal axis, the first and second opposing ends each defining a corresponding first and second passage;
  first and second screens respectively disposed on the first and second opposing ends of the central body, each of the first and second screens including slots configured to allow fluid flow from the body of water to an interior of each of the first and second screens, the interior of the first screen communicating with the internal hollow of the central body through the first passage defined by the first opposing end, the interior of the second screen communicating with the internal hollow of the central body through the second passage defined by the second opposing end; and
  at least one plate disposed within the central body at a location along the longitudinal axis coincident with the position of the outlet along the longitudinal axis, and dividing the internal hollow into portions, a first portion communicating with the first screen, a second portion communicating with the second screen, the at least one plate adapted to merge fluid flow from the first and second portions such that the merged fluid flow has reduced turbulence as the merged fluid flow is directed to the outlet.

2. The screen intake of claim 1, wherein the first screen comprises a first screen sidewall, a first closed distal end, and a first open proximal end, the first open proximal end attached to the first opposing end of the central body, wherein the second screen comprises a second screen sidewall, a second closed distal end, and a second open proximal end, the second open proximal end attached to the second opposing end of the central body.

3. The screen intake of claim 2, wherein the sidewall is cylindrical.

4. The screen intake of claim 1, wherein the first passage defined by the first opposing end comprises at least one pipe having an open distal end disposed inside the first screen and having an open proximal end disposed in the first passage in the first opposing end of the central body, wherein the second passage defined in the second opposing end comprises at least one pipe having an open distal end disposed inside the second screen and having an open proximal end disposed in the second passage in the second opposing end of the central body.

5. The screen intake of claim 1, wherein the first passage defined by the first opposing end comprises at least two pipes with one pipe disposed inside the other, each pipe having an open distal end disposed inside the first screen and having an open proximal end disposed in the first passage in the first opposing end of the central body, wherein the second passage defined by the second opposing end comprises at least two pipes with one pipe disposed inside the other, each pipe having an open distal end disposed inside the second screen and having an open proximal end disposed in the second passage in the second opposing end of the central body.

6. The screen intake of claim 1, wherein the at least one plate comprises a first plate being solid and having a peripheral edge attached at least partially to an inside of the sidewall of the central body.

7. The screen intake of claim 6, wherein the first plate comprises a tab extending radially from the peripheral edge and disposed through the outlet of the central body.

8. The screen intake of claim 7, wherein the tab extends a length into a conduit coupled to the outlet.

9. The screen intake of claim 1, wherein the at least one plate comprises two or more plates disposed adjacent one another in the central body, at least one of the two or more plates defining one or more openings therein.

10. The screen intake of claim 9, wherein the two or more plates comprise at least two plates disposed adjacent one another, each of the at least two plates defining one or more openings therein.

11. The screen intake of claim 9, wherein the two or more plates comprise a central plate, at least one first plate disposed adjacent one side of the central plate, and at least one second plate disposed adjacent another side of the central plate, wherein the at least one first and second plates each define one or more openings therein.

12. The screen intake of claim 11, wherein the central plate defines one or more openings therein.

13. The screen intake of claim 9, wherein at one of the two or more plates comprises a tab extending radially from the peripheral edge and disposed through the outlet of the central body.

14. The screen intake of claim 13, wherein the tab extends a length into a conduit coupled to the outlet.

15. The screen intake of claim 1, wherein both the first portion and the second portion communicate with the outlet.

16. The screen intake of claim 1, wherein the at least one plate internally supports the sidewall of the central body.

17. The screen intake of claim 1, further comprising:
  a first passage defined by the first opposing end the first passage passing through the first end wall of the first opposing end of the central body; and
  a second passage defined by the second opposing the second passage passing through the second end wall of the second opposing end of the central body.

18. The screen intake of claim 17, wherein the at least one plate is attached to the sidewall of the central body.

19. A screen intake, comprising:
  a central body adapted for placement in a body of water, the central body having a longitudinal axis and including a sidewall and first and second opposing ends, the first opposing end with a first end wall contiguous with the sidewall, the second opposing end with a second end wall contiguous with the sidewall, the central body defining an internal hollow, the sidewall defining an outlet therethrough at a position extending a distance along the longitudinal axis, the first opposing end defining a first passage, the second opposing end defining a second passage;

first and second screen members, the first screen member having a first screen sidewall, a closed distal end, an interior, and an open proximal end, the open proximal end connected to the first opposing end of the central body, the second screen member having a second screen sidewall, a closed distal end, an interior, and an open proximal end, the open proximal end connected to the second opposing end of the central body;

first and second flow modifiers, the first flow modifier disposed in the first passage and disposed at least partially in the interior of the first screen member, the first flow modifier communicating the interior of the first screen member with the internal hollow, the second flow modifier disposed in the second passage and disposed a least partially in the interior of the second screen member, the second flow modifier communicating the interior of the second screen member with the internal hollow; and a flow control support device disposed within the central body at a location along the longitudinal axis coincident with the position of the outlet along the longitudinal axis, the flow control support device supporting the sidewall of the central body and dividing the internal hollow into portions, a first portion communicating with the first flow modifier, a second portion communicating with the second flow modifier, the flow control support device merging fluid flow from the first portion and the second portion such that a merged fluid flow has reduced turbulence as the merged fluid flow is directed to the outlet.

20. The screen intake of claim 19, further comprising the first end wall on one side of the flow control support device, the first flow modifier passing therethrough; and the second end wall on the other side of the flow control support device, the second flow modifier passing therethrough.

* * * * *

UNITED STATES PATENT AND TRADEMARK OFFICE
CERTIFICATE OF CORRECTION

PATENT NO. : 10,214,871 B2  
APPLICATION NO. : 13/117405  
DATED : February 26, 2019  
INVENTOR(S) : Ekholm Page 1 of 1

It is certified that error appears in the above-identified patent and that said Letters Patent is hereby corrected as shown below:

In the Claims

Column 6, Line 55, after "opposing", insert --end--

Column 7, Line 19, delete "a" and insert --at--

Signed and Sealed this
Twenty-second Day of October, 2019

Andrei Iancu
*Director of the United States Patent and Trademark Office*